Patented June 30, 1925.

1,544,282

UNITED STATES PATENT OFFICE.

OTTO J. STEINWAND, OF SELMA, CALIFORNIA.

PROCESS OF PREPARING FRUITS.

No Drawing. Application filed July 19, 1924. Serial No. 727,070.

*To all whom it may concern:*

Be it known that I, OTTO J. STEINWAND, a citizen of the United States, residing at Selma, in the county of Fresno and State of California, have invented certain new and useful Improvements in Processes of Preparing Fruits, of which the following is a specification.

This invention relates to processes of preparing fruits, and more particularly to a process of preparing raisins, and similar fruits, such as dried peaches, apricots, prunes, and other dried fruits, to produce a fruit butter, jam, or fruit filler for pies, cakes, and fruit or fruit filled confections.

In the treatment of raisins and similar fruits, it has heretofore been proposed to dip the raisins or other fruits in hot water, or subject them to a steam treatment, to soften the skin and facilitate removal of the seeds.

In the present invention, raisins and other fruits are dipped in warm water at a lower temperature than that heretofore employed, so that the fruits will retain their natural flavor and at the same time, the pulp will assume a jelly-like condition. The temperature employed is preferably from 170° to 200° F. After the fruit is removed from the warm water, it is then dipped in a lye solution to remove the skin. It is then dipped in cold water to remove the lye and cool the fruit and a substance is produced that is smoother, more palatable, and more pleasant than similar products heretofore obtained when the water treatment is used alone and a higher temperature employed or when the lye treatment is used alone.

The sudden cooling of the raisins, after being dipped in the hot lye solution furthermore prevents sugaring or crystallizing of the fruit, which has heretofore very materially interfered with the marketing of seeded raisins.

An object of the invention is the production of a jelly-like or soft fruit butter-like product, in which the natural flavor and taste of the fruit is preserved and in which the vitamines and other beneficial elements of the raw fruit are not lost by cooking.

A further object of the invention is the provision of a product suitable for use as a base in the manufacture of jams, jellies, preserves, confections, and similar products.

In practicing the process, the raisins, or other fruits, are first freed from stems, seeds, and pits, and thoroughly cleaned and graded by any proper means. They are then dipped in water, heated sufficiently to cause the tissues of the fruit to be disrupted and penetrated by the syrupy, fruit sugars present in the fruit. The temperature employed in this step of the process is from 170° to 200° F., and the time of the process varies from 3 to 7 minutes, according to the size and condition of the fruit. By employing a temperature near 200° F., less time is employed in the treatment and conversely, when a lower temperature is employed, the fruit is immersed in the water for a longer period of time. After the fruit has been removed from the water, it is then dipped in a hot solution of soda lye of proper strength and temperature to entirely remove the skin or to remove the outer, harder part of the skin and render the inner part soft and pulpy. The lye solution should be maintained at a temperature ranging from 180° to 200° F., according to the time of immersion and the strength of the solution. The lye solution is formed by dissolving 16 ounces of sodium hydroxid in from 3 to 5 gallons of water. The fruit should be submitted to the action of the lye solution for a period varying from 15 to 30 seconds, according to the strength of the solution, and its temperature. The fruit is then instantly washed and agitated in cold water to cool it and remove all traces of sodium hydroxid.

It is then reduced to a homogeneous mass by running it through a burr mill, attrition mill, or other suitable apparatus that will thoroughly comminute the pulpy mass and mix it to a perfect smoothness and uniform consistency.

In the case of raisins and other fruits which have a large portion of their acidity in or near the skin, the portion of acidity lost in the process is restored by the addition of a sufficient quantity of cream of tartar or tartaric acid.

By means of the process described, I obtain a soft jelly-like product in which the natural taste, and flavor of the fruit is retained and in which the cooked effect which would be obtained if the fruit were submitted to treatment at higher temperatures is avoided.

While I have described in detail the preferred practice of my process, it is to be understood that the details of procedure may be widely varied without departing from the spirit of the invention or the scope of the subjoined claims.

I claim:

1. The process of treating fruit which comprises immersing it in hot water at a temperature below 200° F., then dipping the fruit in a lye solution to remove the skin, and then reducing the same to a homogeneous mass to form a jelly-like product.

2. The process of treating fruit which comprises immersing it in hot water at a temperature below 200° F., then dipping the fruit in a lye solution to remove the skin, then rinsing the fruit in cold water, and then reducing it to a homogeneous mass to form a jelly-like product.

3. The process of treating fruit which comprises immersing it in hot water at a temperature below 200° F., then dipping the fruit in a lye solution at a temperature below 200° F. to remove the skin, and then reducing it to a homogeneous mass to form a jelly-like product.

4. The process of treating fruit which comprises immersing it in hot water at a temperature below 200° F. for a period of from 3 to 7 minutes, then dipping it in a lye solution to remove the skin and then reducing it to a homogeneous mass to form a jelly-like product.

5. The process of treating fruit which comprises immersing the fruit in hot water at a temperature between 170° to 200° F. for a period of from 3 to 7 minutes, then dipping the fruit in a hot lye solution to remove the skin, and then reducing it to a homogeneous mass to form a jelly-like product.

6. The process of treating fruit which comprises immersing it in hot water at a temperature between 170° and 200° F. for a period of from 3 to 7 minutes, then dipping the fruit in a hot lye solution at a temperature below 212° F. for a period of from 15 to 30 seconds to remove the skin, then rinsing it in cold water, and then reducing it to a homogeneous mass to form a jelly-like product.

In testimony whereof, I affix my signature in presence of two witnesses.

OTTO J. STEINWAND.

Witnesses:
E. C. LAUGHLIN,
Dr. A. R. STEINWAND.